United States Patent [19]

Lohrbaecher et al.

[11] Patent Number: 5,026,763
[45] Date of Patent: Jun. 25, 1991

[54] POLYAMIDE MOLDING MATERIALS

[75] Inventors: Volker Lohrbaecher, Weinheim; Erich Pellkofer, Mutterstadt, both of Fed. Rep. of Germany

[73] Assignee: BASF Aktiengesellschaft, Ludwigshafen, Fed. Rep. of Germany

[21] Appl. No.: 381,973

[22] Filed: Jul. 19, 1989

[30] Foreign Application Priority Data

Aug. 9, 1988 [DE] Fed. Rep. of Germany ....... 3826950

[51] Int. Cl.$^5$ .............................................. C08L 77/00
[52] U.S. Cl. ...................................... 524/495; 525/432
[58] Field of Search ......................... 525/432; 524/495

[56] References Cited

U.S. PATENT DOCUMENTS

| | | | |
|---|---|---|---|
| 2,712,507 | 7/1955 | Green | 117/36 |
| 3,002,385 | 10/1961 | Wahl et al. | 73/356 |
| 3,695,903 | 10/1972 | Telkes et al. | 99/192 |
| 3,767,449 | 10/1973 | Hayashi et al. | 117/36.2 |
| 3,774,450 | 11/1973 | Godsey | 73/358 |
| 3,826,141 | 7/1974 | Pickett et al. | 73/356 |
| 3,924,027 | 12/1975 | Saito et al. | 427/147 |
| 3,954,011 | 5/1976 | Manske | 73/356 |
| 4,046,941 | 9/1977 | Saito et al. | 428/323 |
| 4,057,029 | 11/1977 | Seiter | 116/114 |
| 4,114,926 | 9/1978 | Habib et al. | 282/27.5 |
| 4,134,847 | 1/1978 | Oda et al. | 252/62.1 |
| 4,173,684 | 11/1979 | Stolfo | 428/531 |
| 4,269,893 | 5/1981 | Kato et al. | 428/341 |
| 4,301,054 | 11/1981 | Buirley et al. | 260/29.4 |
| 4,339,207 | 7/1982 | Hof et al. | 374/160 |
| 4,379,897 | 4/1983 | Asano et al. | 525/506 |
| 4,388,362 | 6/1983 | Iwata et al. | 428/211 |
| 4,398,753 | 8/1983 | Asano et al. | 282/27.5 |
| 4,400,492 | 8/1983 | Asano et al. | 525/506 |
| 4,469,452 | 9/1984 | Sharpless et al. | 374/160 |
| 4,556,696 | 12/1985 | Stewart et al. | 525/432 |
| 4,620,941 | 11/1986 | Yoshikawa et al. | 252/408.1 |
| 4,634,588 | 1/1987 | Moroe | 424/48 |
| 4,637,896 | 1/1987 | Shannon | 252/299.7 |
| 4,657,952 | 5/1987 | Kerschbaumer et al. | 523/351 |
| 4,704,379 | 11/1987 | Shioi et al. | 503/211 |
| 4,729,671 | 3/1988 | Asano et al. | 374/160 |
| 4,783,521 | 11/1988 | Yamaguchi et al. | 528/206 |

FOREIGN PATENT DOCUMENTS

| | | | |
|---|---|---|---|
| 234743 | 1/1960 | Australia | 525/432 |
| 0268878 | 1/1988 | European Pat. Off. | |
| 0283924 | 9/1988 | European Pat. Off. | |
| 2631832 | 1/1978 | Fed. Rep. of Germany | |
| 2352674 | 5/1977 | France | |
| 15111 | 5/1947 | Japan | |
| 10856 | 3/1952 | Japan | |
| 9309 | 5/1965 | Japan | |
| 20144 | 10/1967 | Japan | |
| 1327 | 1/1977 | Japan | |
| 124032 | 9/1980 | Japan | |
| 4319 | 1/1982 | Japan | |
| 28559 | 2/1982 | Japan | |
| 87030 | 4/1982 | Japan | |
| 76088 | 4/1984 | Japan | |
| 53984 | 3/1985 | Japan | |
| 100493 | 5/1986 | Japan | |
| 132857 | 6/1986 | Japan | |
| 84045 | 4/1987 | Japan | |
| 96449 | 5/1987 | Japan | |
| 112537 | 5/1988 | Japan | |
| 56724 | 3/1989 | Japan | |
| 77515 | 3/1989 | Japan | |
| 850986 | 10/1960 | United Kingdom | 525/432 |

*Primary Examiner*—Ana L. Carrillo
*Attorney, Agent, or Firm*—Oblon, Spivak, McClelland, Maier & Neustadt

[57] ABSTRACT

Polyamide molding materials having high heat distortion resistance for the production of blow-molded articles contain essentially two highly viscous polyamides which are homogeneously miscible with one another and have melting points which differ by 10°–50° C., the amount of the polyamide having the low melting point being from 5 to 40% by weight and the amount of that having the high melting point being from 60 to 95% by weight.

9 Claims, No Drawings

POLYAMIDE MOLDING MATERIALS

Hollow articles of polyamides can be produced in a simple manner by blow molding. For this purpose, tubular preforms are extruded continuously or batchwise by means of an extruder and a parison head and discharged between a two-part blow mold. When the blow mold is clamped by means of a clamping unit, the preform is closed above and below up to the position of the blow orifice by pinch-off welds through the pinch-off areas on the blow mold. After the blow mold has been clamped, that part of the preform which is present in the mold cavity is expanded by means of a compressed gas until it rests against the mold wall, and is cooled on the mold wall. After cooling, the blow mold is opened and the hollow article is removed.

The only polyamides which are suitable for blow molding are those which have a very high viscosity in the melt. Usually, high molecular weight polyamides whose viscosity number according to DIN 53,727 (sulfuric acid) is not less than 150, in particular not less than 200, are used. Although low-melting polyamides, such as nylon 6, have a sufficiently wide temperature range in which processing is possible, the hollow articles have an unsatisfactory heat distortion resistance. Although high-melting polyamides, such as nylon 6,6, have a high heat distortion resistance, the processing temperature range is so narrow that the preform can no longer be processed to give satisfactory hollow articles, owing to drawdown in the mold.

It is an object of the present invention to provide polyamide molding materials for blow molding which have high heat distortion resistance and a wide processing temperature range.

It is a further object of the present invention to produce articles from polyamide by blow molding, the said articles having high rigidity, high strength and little distortion. It is true that it was known that the strength properties of polyamides can be improved by adding reinforcing fillers, such as glass fibers. However, it has not been possible to date to process glass fiber-reinforced polyamides by blow molding.

We have found that this object is achieved and that, surprisingly, polyamide molding materials which consist of a mixture of two highly viscous polyamides having different melting points fulfil these conditions. They can even be processed by blow molding when they contain reinforcing fillers. They are suitable for the production of blow-molded articles having a length of up to 1.20 m and a volume of up to 10 l.

The present invention relates to polyamide molding materials having improved processing properties for the production of blow-molded articles, consisting essentially of two different polyamides which have a high melt viscosity suitable for blow molding, are homogeneously miscible with one another in the melt and have melting points which differ by 10°-50° C., wherein the amount of polyamide (a) having the low melting point is from 5 to 40% by weight and the amount of polyamide (b) having the higher melting point is from 60 to 95% by weight.

The novel molding materials consist of a mixture of two different polyamides which are homogeneously miscible with one another. All known polyamides which have a melt viscosity which is sufficiently high for blow molding are suitable starting materials. This is the case when their viscosity number according to DIN 53,727 (sulfuric acid) is not less than 150, preferably from 180 to 500, in particular from 200 to 400. DIN 53,727 corresponds to ASTM 2857, the viscosity number being determined at a concentration of 0.00625 g/cm$^3$ in sulfuric acid (96%).

Examples are polyhexamethyleneadipamide (nylon 6,6), polyhexamethyleneazelaamide (nylon 6,9), polyhexamethylenesebacamide (nylon 6,10), polyhexamethylenedodecanediamide (nylon 6,12), the polyamides obtained by ring cleavage of lactams, e.g. polycaprolactam and polylaurolactam, as well as poly-11-aminoundecaneamide and bis-(p-aminocyclohexyl)-methanedodecanediamide.

Polyamides based on terephthalic acid or isophthalic acid as the acid component, or on trimethylhexamethylenediamine or bis-(p-aminocyclohexyl)-propane as the diamine component, can also be used. Polyamide base resins which have been prepared by copolymerization of two of the abovementioned polymers or of terpolymerization of the abovementioned polymers or of their components, for example the copolymer of adipic acid, isophthalic acid and hexamethylenediamine, are also suitable.

Preferably, the polyamides are linear and have melting points of more than 170° C., in particular more than 200° C., but they may also be branched or crosslinked. The melting points of the two polyamide components should differ by 10°-50° C., preferably 20°-40° C., the amount of polyamide (a) having the low melting point being from 5 to 40, preferably from 20 to 30%, by weight and the amount of polyamide (b) having the higher melting point being from 60 to 95, preferably from 70 to 80%, by weight.

For example, mixtures of nylon 6 (melting point about 220° C.), or nylon 6,10 (melting point about 215° C.), with nylon 6,6 (melting point about 255° C.) are suitable. Mixtures of nylon 6 (polycaprolactam) having a viscosity number (sulfuric acid) of not less than 280 and nylon 6,6 (polyhexamethyleneadipamide) having a viscosity number (sulfuric acid) of not less than 200 are preferably used.

The mechanical properties of the hollow articles produced from the molding materials can be improved by adding finely divided reinforcing fillers.

Examples of suitable fillers are talc, mica, preferably wollastonite, asbestos, carbon fibers and in particular glass fibers.

The reinforcing fillers are used in amounts of not more than 55, preferably from 10 to 50%, by weight, based on the polyamides. The glass fibers used generally have a mean fiber length of from 50 to 1,000 μm, in particular from 50 to 300 μm, and a diameter of from 5 to 20 μm.

The molding materials may furthermore contain conventional additives in effective amounts, such as dyes, pigments, lubricants, flameproofing agents and/or stabilizers. The molding materials may consist of an intimate mixture of all their components, the said mixture being prepared by mixing in the melt in a suitable mixing apparatus, for example in an extruder. However, the molding material may also be in the form of a coarse mixture of the individual components, which is not homogenized until directly during further processing in the extruder, in the melt. The unreinforced molding materials according to the invention have in general, as a polyamide mixture, a melt index by volume MVI (according to DIN 53,735, Part 10, Method B; nozzle L : D=8 2.1 mm; F=5 kp; 280° C. corresponding to International Standard 150 1122-1981 of from 2 to 20, in particular from 3 to 15, cm³/10 min. In the case of the reinforced molding materials, the MVI is in general from 1 to 20, preferably from 2.5 to 15, cm³/10 min.

EXAMPLES 1 TO 4

Preforms were extruded continuously by means of an extruder having a parison head and were blown in a blow mold to give bottles having a weight of 25 g and a volume of 310 cm³. Branched polycaprolactam having a melting point of about 220° C. and a viscosity number (sulfuric acid) of 320 (Ultramid ® 94 from BASF Aktiengesellschaft) was used as polyamide (a). Straight-chain polyhexamethyleneadipamide having a melting point of about 225° C. and a viscosity number (sulfuric acid) of 270 (Ultramid ® A5 from BASF Aktiengesellschaft) was used as polyamide (b). The composition of the molding materials and the results are shown in Table 1.

EXAMPLES 5 TO 11

The procedure was similar to that described in Examples 1 to 4. Bottles having a volume of 310 cm³ and different wall thicknesses were produced. The starting materials used were as follows:

(a) branched polycaprolactam, melting point about 220° C., viscosity number (sulfuric acid) 320 (Ultramid ® 94 from BASF Aktiengesellschaft)

(b) glass fiber-reinforced polyhexamethyleneadipamide, melting point about 255° C., viscosity number (sulfuric acid) 250, glass fiber content 25% by weight, mean glass fiber length 250 μm, diameter 10 μm (Ultramid ® 84/5 from BASF Aktiengesellschaft).

The results are summarized in Table 2.

ides which have a high melt viscosity suitable for blow molding, are homogeneously miscible with one another in the melt and have melting points which differ by 10°–50° C., wherein the amount of polyamide (a) having a low melting point has a viscosity numer according to DIN 53,727 (sulfuric acid) of not less than 280 and is from 5 to 40% by weight and the amount of polyamide (b) having the higher melting point has a viscosity number according to DIn 53,727 (sulfuric acid) of not less than 150 and is from 60 to 95% per weight.

2. A polyamide molding material as claimed in claim 1, wherein component (a) is polycaprolactam and component (b) is polyhexamethyleneadipamide.

3. A polyamide molding material as claimed in claim 1, wherein the polaymide mixture has a melt index by volume MVI (according to DIN 53,735, part 10, method B; nozzle L:D=8:2.1 mm; F=5 Kp; 280° C.) of from 2 to 20 cm³/10 min.

4. A polyamide molding material as claimed in claim 2, wherein the polayamide mixture has a melt index by volume MVI (according to DIN 53,735, part 10, Method B; nozzle L:D=8:2.1 mm; F=5 Kp; 280° C.) of from 2 to 20 cm³/10min.

5. A polyamide molding material as claimed in claim 1, which contains not more than 55% by weight, based on the polyamide mixture, of reinforcing fillers.

6. A polyamide molding material as claimed in claim 1, which contains not more than 55% by weight, based on the polyamide mixture, of glass fibers having a mean fiber length of from 50 to 1,000 μm and a diameter of from 5 to 20 μm.

7. A polyamide molding material as claimed in claim 5, which has a melt index by volume MVI of from 1 to 20 cm³/10 min.

8. A blow-molded article obtained by blow-molding a

TABLE 1

| Example | Polyamide (a) % by wt. | Polyamide (b) % by wt. | Processing temperature range (°C.) | Heat distortion resistance ISO 75 (°C.) Method A | Heat distortion resistance ISO 75 (°C.) Method B | Bursting pressure (bar) | MVI 280° C., 5 kp 8:2.1 (cm³/10 min) | Tensile strength DIN 53,455 [N/mm²] | Elongation DIN 53,455 [%] |
|---|---|---|---|---|---|---|---|---|---|
| 1 (Comparison) | 100 | — | 235–280 | 40 | 140 | 16 | 5.4 | 83 | 280 |
| 2 | 5 | 95 | 265–280 | 90 | >200 | 15 | 8.9 | 65 | 180 |
| 3 | 20 | 80 | 265–280 | 80 | >200 | 14 | 6.8 | 75 | 250 |
| 4 (Comparison) | — | 100 | 265–270 | 100 | >200 | * | 9.2 | — | — |

*Because of the narrow processing temperature range, it was impossible to produce any satisfactory hollow articles

TABLE 2

| Example | (a) % by wt. | (b) % by wt. | Glass fibers % by wt., based on polyamide | Processing temperature range (°C.) | Heat distortion resistance (°C.) ISO 75 Method A | Heat distortion resistance (°C.) ISO 75 Method B | Mean wall thickness (mm) | Bursting pressure (bar) | MVI 280°C., 5 kp 8:2.1 (cm³/10 min) | Tensile strength DIN 53,455 [N/mm²] Longitudinal | Tensile strength DIN 53,455 [N/mm²] Transverse | Elongation DIN 53,455 [%] |
|---|---|---|---|---|---|---|---|---|---|---|---|---|
| 5 | 10 | 90 | 29 | 235–280 | 240 | 250 | 0.65 | 7 | 15.1 | 66 | 33 | 8 |
| 6 | 20 | 80 | 25 | 230–280 | 230 | 240 | 0.65 | 14 | 11.4 | 66 | 45 | 10 |
| 7 | 30 | 70 | 21 | 235–280 | 220 | 230 | 0.65 | 16 | 9.3 | 69 | 50 | 12 |
| 8 | 20 | 80 | 25 | 235–280 | 230 | 240 | 0.9 | 17 | 11.1 | 66 | 45 | 10 |
| 9 | 30 | 70 | 21 | 235–280 | 220 | 230 | 0.9 | 18 | 10.3 | 69 | 50 | 12 |
| 10 | 30 | 70 | 21 | 235–280 | 220 | 230 | 1.3 | 25 | 10.2 | 69 | 50 | 12 |
| 11 | 40 | 60 | 15 | 235–280 | 200 | 230 | 1.3 | 27 | 8.3 | 72 | 55 | 12 |

We claim:

1. A polyamide molding material having high heat distortion resistance for the production of blow-molded articles, consisting essentially of two different polyamides composition as defined in claim 1.

9. A blow-molded article obtained by blow-molding a composition as defined in claim 5.

* * * * *